US007752242B1

(12) United States Patent
Satish et al.

(10) Patent No.: US 7,752,242 B1
(45) Date of Patent: Jul. 6, 2010

(54) EXECUTING UNMANAGED CONTENT IN A MANAGED EXECUTION ENVIRONMENT (75) Inventors: Sourabh Satish, Fremont, CA (US); Matthew Conover, East Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 936 days.

(21) Appl. No.: 11/231,681

(22) Filed: Sep. 20, 2005

(51) Int. Cl.
*G06F 12/00* (2006.01)
*G06F 17/30* (2006.01)
(52) U.S. Cl. .................................................. 707/826
(58) Field of Classification Search ................ 717/136, 717/138; 707/826
See application file for complete search history.

(56) References Cited

U.S. PATENT DOCUMENTS

| 6,598,141 | B1 * | 7/2003 | Dussud et al. ............... 711/170 |
| 6,898,611 | B1 * | 5/2005 | Dussud et al. ............... 707/206 |
| 7,017,162 | B2 * | 3/2006 | Smith et al. ................. 719/328 |
| 2004/0199927 | A1 * | 10/2004 | Liu et al. ..................... 719/328 |
| 2005/0091635 | A1 * | 4/2005 | McCollum et al. ........... 717/101 |
| 2005/0246677 | A1 * | 11/2005 | Mountain et al. ............ 717/100 |

OTHER PUBLICATIONS

Keserovic et al.: "An Overview of Managed/Unmanaged Code Interoperability", Microsoft Corporation Oct. 2003.*

"About .NET Security," gotdotnet.com, Microsoft Corporation [online] 2005 [Retrieved on Dec. 19, 2005] Retrieved from the Internet: <URL: http://www.gotdotnet.com/team/clr/about_security.aspx>. 3 pages.

Brown, Keith, "Security in Longhorn: Focus on Least Privilege," Microsoft Corporation [online] Apr. 2004 [Retrieved on Dec. 19, 2005] Retrieved from the Internet: <URL: http://msdn.microsoft.com/library/default.asp?url=/library/en-us/dnlong/html/leastprivlh.asp?frame=true>. 8 pages.

(Continued)

*Primary Examiner*—Kuen S Lu
(74) *Attorney, Agent, or Firm*—Fenwick & West LLP (57) ABSTRACT

A legacy application program contains unmanaged code. Application definitions for common unmanaged applications are established. An application definition includes a manifest that describes the unmanaged code and an execution wrapper that projects the unmanaged code as a managed assembly to the execution environment. An application definition can also specify other modifications to the unmanaged code, such as modifications to cause the unmanaged code to call managed application programming interfaces (APIs). The application definition is utilized to transform the unmanaged code into a managed assembly. The manifest and wrapper are added to the managed assembly and the unmanaged code is maintained as a resource. The managed execution environment uses the manifest to compute a permissions set for the unmanaged code, and the wrapper invokes the unmanaged code. The unmanaged code uses the managed APIs, and the managed execution environment can therefore manage execution of the code.

19 Claims, 5 Drawing Sheets

OTHER PUBLICATIONS

Griffith, Rean et al., "Manipulating Managed Execution Runtimes to Support Self-Healing Systems," International Conference on Software Engineering, Proceedings of the 2005 Workshop on Design and Evolution of Autonomic Application Software in St. Louis, MO, 2005, 7 pages, ACM Press, New York, NY.

McNaughton, Allan, "Optimizing .NET* Performance with Unmanaged Code," Intel.com [online] [Retrieved on Dec. 19, 2005] Retrieved from the Internet: <URL: http://www.intel.com/cd/ids/developer/asmo-na/eng/20156.htm?prn=Y>. 4 pages.

Meijer, Eric et al., "Technical Overview of the Common Language Runtime," Microsoft Corporation, Jun. 8, 2001, 16 pages.

Parmar, Chandrakant, "Understanding .NET Framework At A Glance" [online] Jun. 8, 2004 [Retrieved on Dec. 19, 2005] Retrieved from the Internet: <URL: http://www.codeproject.com/dotnet/DotNetWhitePaper.asp>. 13 pages.

"Security Policy Best Practices, MSDN Template for Authoring," gotdotnet.com, Microsoft Corporation [online] [Retrieved on Dec. 19, 2005] Retrieved from the Internet: <URL: http://www.gotdotnet.com/team/clr/SecurityPolicyBestPractices.htm>. 15 pages.

* cited by examiner

EXECUTING UNMANAGED CONTENT IN A MANAGED EXECUTION ENVIRONMENT

BACKGROUND OF THE INVENTION

1. Field of the Invention

This invention pertains in general to computer security and in particular to executing legacy computer programs within new security paradigms.

2. Description of the Related Art

Computer security has become increasingly important in recent times. Server computers that store confidential data, such as credit card numbers or medical records, must be protected from attempts by malicious attackers to obtain the data. Likewise, other computers such as home computers must be protected from malicious software such as viruses, worms, spyware, Trojan horse programs, and other similar threats that an end-user is likely to encounter when connected to the Internet. Modern operating systems, such as Unix, Linux, and MICROSOFT WINDOWS XP incorporate security paradigms that are intended to protect the computers from malicious behaviors.

Until recently, computer security paradigms relied on the concept of "transitive security" to protect the computer. A end-user having a defined role is assigned a set of permissions by the operating system. All code executed by that user has the same set of permissions as the end-user. Transitive security can be problematic if an end-user having broad permissions executes malicious software because the malicious software will also have broad permissions.

Newer operating systems support paradigms that specify the permissions based at least in part on the code itself. Microsoft's new operating systems, for example, provide a feature called ".NET Security.".NET Security is based on three aspects: 1) managed code; 2) role-based security; and 3) evidence-based security. Managed code is supervised by the operating system as it is executed to ensure that it does not perform any operations that exceed the scope of its permissions. Role-based security means that the code has permissions defined in part by the role of the end-user that executes the code. Under evidence-based security, the permissions of the code are determined in part by the trustworthiness of the end-user and/or code itself.

Code must be specially written to take advantage of the features of .NET Security. The operating systems execute legacy code not written for .NET Security in a "native" mode that relies on role-based transitive security. There is a large base of legacy code, and it is likely that much of the code will never be revised to utilize .NET Security. As a result, computers supporting .NET Security will likely execute a large amount of legacy code under a transitive security paradigm, with the attendant security risks. Therefore, there is a need in the art for a way to allow legacy code to take advantage of the security provided by .NET Security and other similar environments.

BRIEF SUMMARY OF THE INVENTION

The above need is met by adapting the legacy, unmanaged code to execute in a managed execution environment such as MICROSOFT's Common Language Runtime (CLR). Application definitions for common and/or popular legacy applications are established by a security software vendor. An application definition includes a manifest describing the unmanaged code and an execution wrapper that invokes the unmanaged code within the managed execution environment. An application definition can also specify modifications to the unmanaged code, such as modifications to cause the unmanaged code to call managed application programming interfaces (APIs) instead of legacy, unmanaged APIs.

A transformation module executing on a computer system analyzes the unmanaged code and selects a corresponding application definition. The transformation module uses the application definition to transform the unmanaged code into a managed assembly. The manifest and wrapper are added to the managed assembly and the unmanaged code is maintained as a resource either within the same file or in an auxiliary file. In addition, the transformation module makes the modifications to the unmanaged code specified by the application definition to cause the unmanaged code to use managed APIs.

When the managed execution environment receives the managed assembly, it computes a permissions set for it from the manifest and a security policy. The wrapper is executed within a domain having the permissions set, which in turn invokes the unmanaged code. The unmanaged code uses the managed APIs, thereby allowing the managed execution environment to manage execution of the code.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
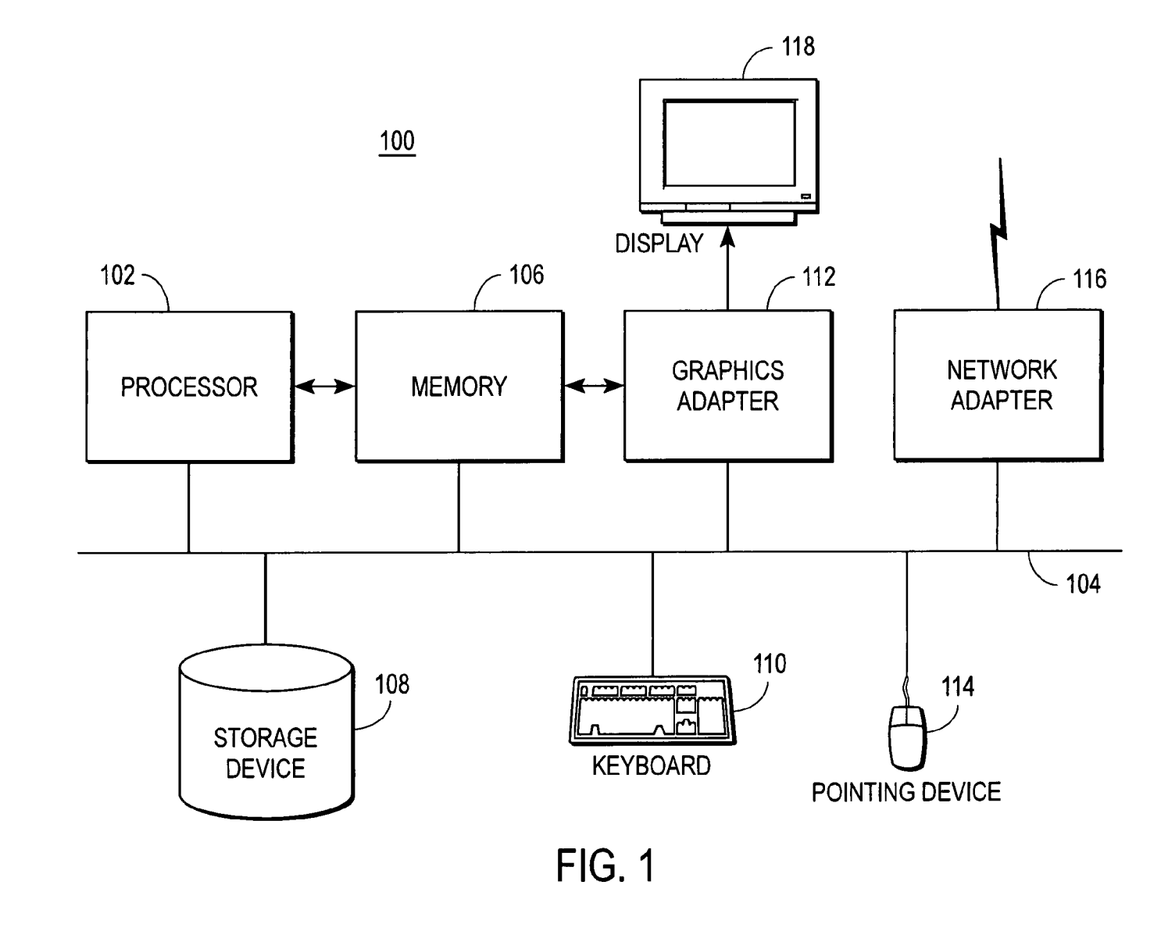
FIG. 1 is a high-level block diagram showing a computer system for executing computer programs in a managed execution environment according to one embodiment.

FIG. 1 is a high-level block diagram showing a computer system 100 for executing computer programs in a managed execution environment according to one embodiment. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. Computer systems acting in different roles may have different and/or additional elements than the ones shown in FIG. 1. For example, a computer system 100 acting as a server may have greater processing power and a larger storage device than a computer system acting as a client. Likewise, a computer system 100 acting as a server may lack devices such as a display 118 and/or keyboard 110 that are not necessarily required to operate it.

As is known in the art, the computer system 100 is adapted to execute computer program modules. As used herein, the term "module" refers to computer program logic for providing the specified functionality. A module can be implemented in hardware, firmware, and/or software. A module is typically stored on the storage device 108, loaded into the memory 106, and executed by the processor 102.

Figure 2:
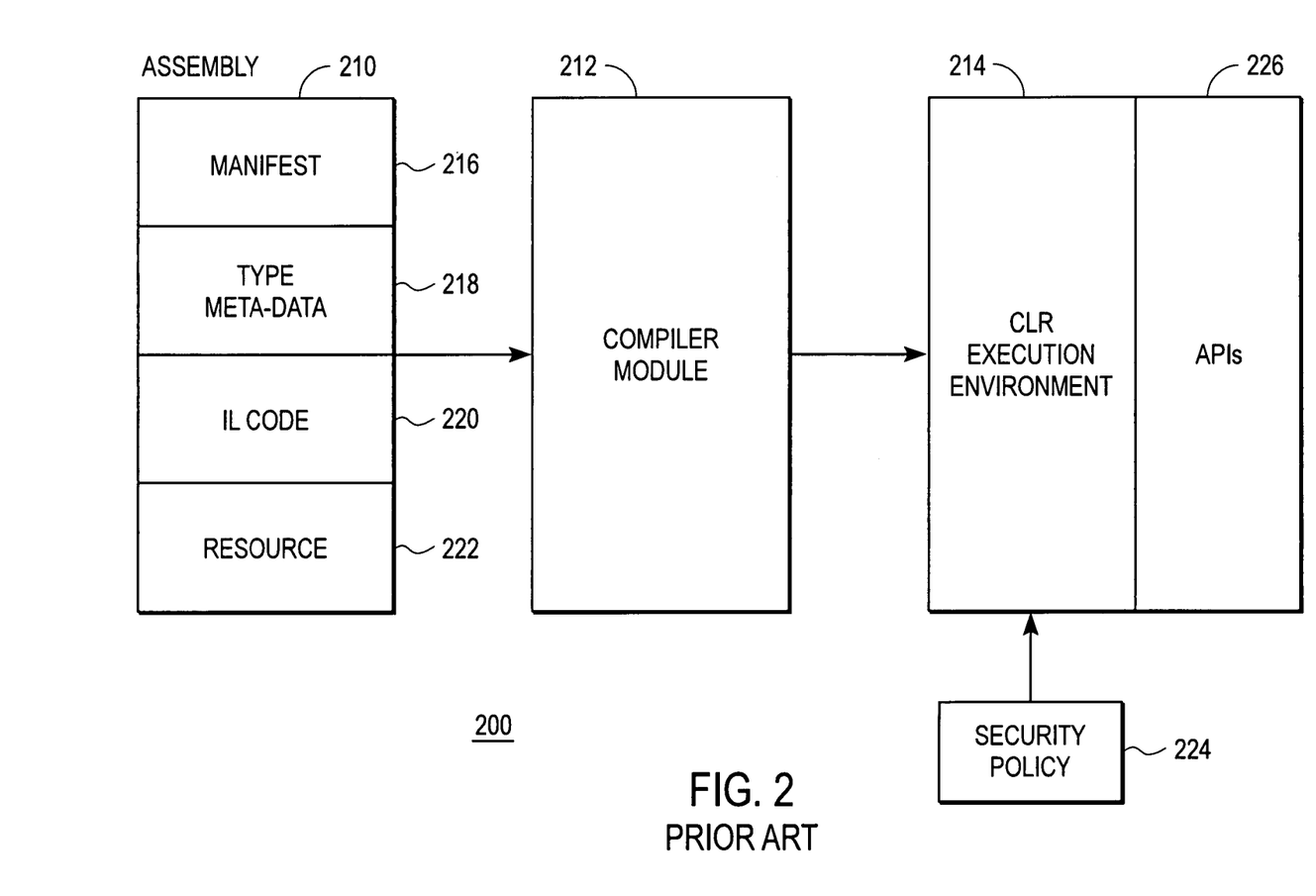
FIG. 2 is a high-level block diagram illustrating a logical view of a prior art security paradigm including a common language runtime (CLR) managed execution environment.

FIG. 2 is a high-level block diagram illustrating a logical view of a prior art security paradigm 200 including a common language runtime (CLR) managed execution environment 214. Generally, the security paradigm 200 includes an assembly 210 that is compiled by a compiler module 212 to execute in the CLR 214.

The assembly 210 includes a manifest 216 that contains a collection of metadata describing how the other elements in the assembly 210 relate to each other. The metadata in the manifest 216 specify the assembly's version and security requirements, and information needed to define the scope of the assembly 210 and resolve references to resources and classes. To this end, the manifest 216 can describe entry points of code, a hash of the assembly 210 or other data useful for integrity checking, dependent assemblies, etc. In one embodiment, the manifest 216 is encoded in an extensible markup language (XML) document.

The assembly 210 also includes type metadata 218 that describe the data types that are used in the assembly. Further, the assembly 210 includes intermediate-language (IL) code 220, such as Microsoft Intermediate Language (MSIL) code. Typically, the IL code is emitted by a compiler based on source code written in a standard programming language such as C++. The assembly 210 may contain resources 222 that are used by the IL code 220.

The compiler module 212 in the security paradigm 200 produces managed code for the computer system 100 from the IL code 220 in the assembly 210. The compiler module 212 can be a just-in-time compiler that produces the managed code at runtime. The managed code contains instructions in the native format of the computer system 100 (i.e., of the processor 102) and includes functionality for performing tasks such as traps and garbage collection, exception handling, type safety, array bounds and indexing checking, etc.

The CLR 214 is a managed execution environment. In one embodiment, the CLR 214 is provided by a Windows-based operating system from MICROSOFT CORPORATION as part of .NET security, but in other embodiments the CLR 214 is provided by LINUX, UNIX, or other operating systems. The CLR 214 receives the manifest 216 from the assembly 210 and a defined runtime security policy 224. The CLR 214 uses the manifest 216 and the security policy 224 to compute the effective permissions set for the managed code produced by the compiler module 212. The CLR 214 loads the managed code into a domain having the computed permissions and executes the code within that domain. During execution, the managed code will typically make calls to application program interfaces (APIs) 226 provided by the CLR 214. These APIs can include managed APIs, such as the WinFX APIs provided by some MICROSOFT operating systems, and legacy APIs that are not designed for use with managed code. As used herein, the term "CLR" refers to any common language runtime infrastructure having the characteristics described herein, and does not necessarily refer to a particular implementation.

Figure 3:
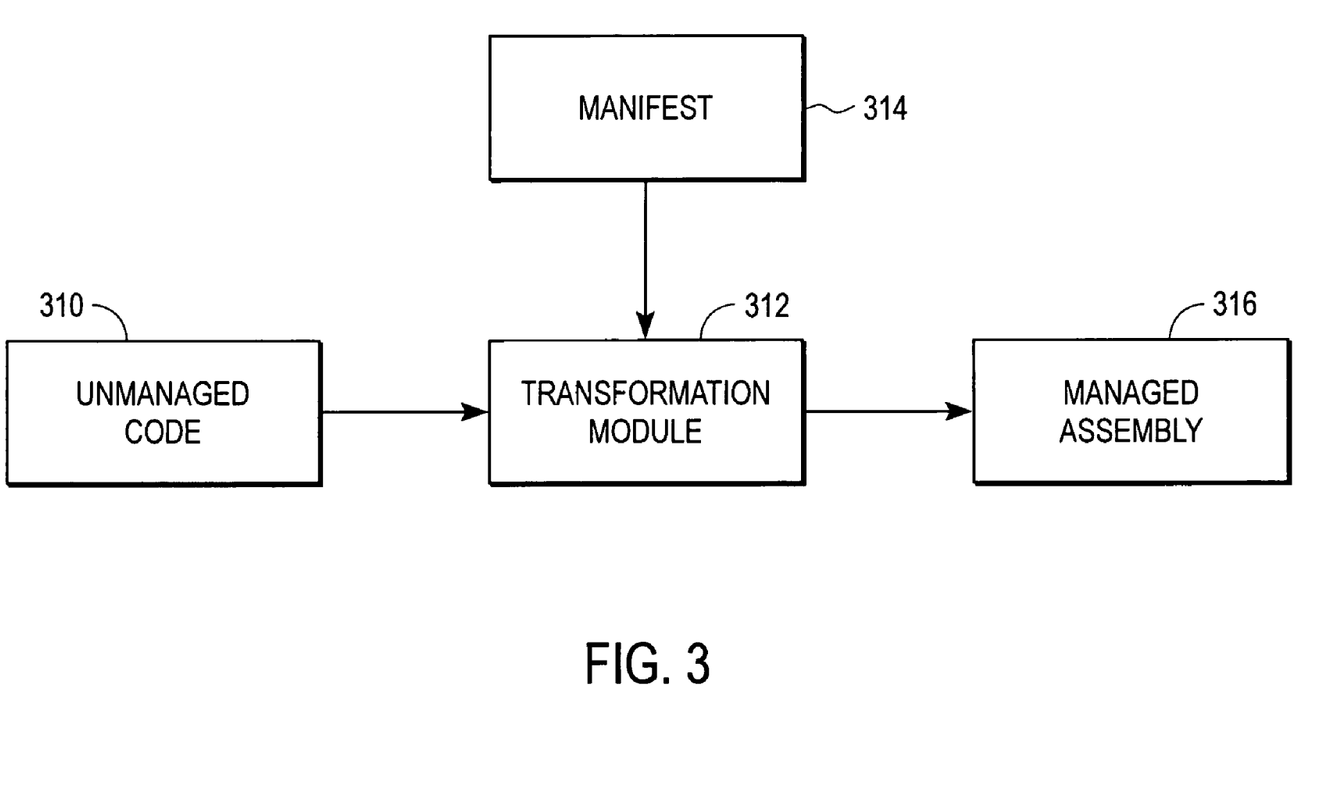
FIG. 3 is a high-level block diagram illustrating a technique for adapting unmanaged code to execute within the CLR of FIG. 2 according to one embodiment.

FIG. 3 is a high-level block diagram illustrating a technique for adapting unmanaged code to execute within the CLR 214 of FIG. 2 according to one embodiment. The unmanaged code 310 is typically a legacy application embodied within a Portable Executable (PE) file stored by the computer system 100. The PE file can be an executable file having a ".EXE" extension or a dynamic link library (DLL) having a ".DLL" extension. The PE file includes an import address table (IAT) describing the API calls that are made by the unmanaged code.

A transformation module 312 executing on the computer system 100 analyzes the unmanaged code 310, pairs it with an appropriate manifest 314, and transforms it into a managed assembly 316 that can execute within the CLR 214. The transformation module 312 also alters the unmanaged code 310, if necessary, to make it better execute within the CLR 214. Depending upon the embodiment, the alterations can include changing the IAT of the unmanaged code's PE file to call managed code APIs instead of the legacy, unmanaged APIs and setting attributes of the PE file to mark it as managed code. The alterations can also include adding a managed code wrapper around the unmanaged code. The wrapper directs execution to the entry point of the unmanaged code 310 when it is executed in the CLR 214.

In one embodiment, the transformation module 312 is provided by a security software vendor. The transformation module 312 can be, for example, a standalone program, incorporated into a security suite or other software package, or incorporated into the operating system as a shell extension or other component. In one embodiment, the transformation module 312 executes whenever the computer system 100 is active and monitors all code executed by the computer system 100. When the transformation module 312 detects that the operating system has been asked to execute unmanaged code, the transformation module intercepts the request and performs its functions before the code is executed. In other embodiments, the transformation module 312 operates at other times. For example, the transformation module 312 can scan the storage device 108 a priori to identify unmanaged code and create corresponding managed assemblies.

Figure 4:
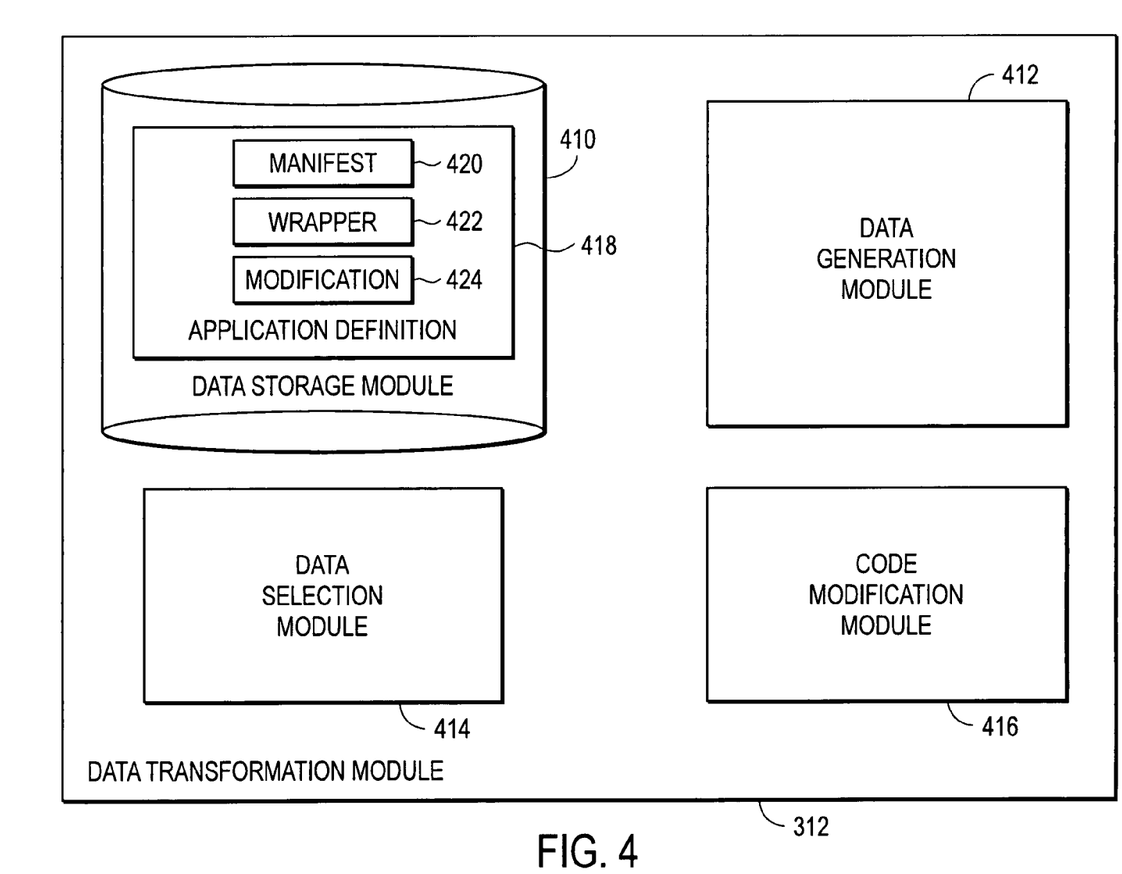
FIG. 4 is a high-level block diagram illustrating a more detailed view of the transformation module according to one embodiment.

FIG. 4 is a high-level block diagram illustrated a more detailed view of the transformation module 312 according to one embodiment. Those of skill in the art will recognize that other embodiments can have different and/or additional modules than the ones shown in FIG. 4. In addition, the functionalities attributed to the modules can be distributed among the modules in different manners.

The transformation module 312 includes a data storage module 410 holding application definitions 418 for use in creating managed assemblies 316 from unmanaged code 310. Generally, each application definition 418 stores information describing how to transform a specific unmanaged application program (i.e., the unmanaged code) into a managed assembly optimized for execution in the CLR 214. In one embodiment, the application definitions 418 are developed by a security software vendor and provided to the transformation module 312. For example, the security software vendor can analyze the characteristics of popular and/or common unmanaged application programs and develop an application definition 418 tailored for creating an optimized managed assembly for that application. The security software vendor distributes the application definitions 418 to the transformation modules 312 of computer systems 100 by having the transformation modules 312 or other modules on the computer systems download the definitions from a server on a network, read the definitions from a computer-readable medium, and/or obtain the definitions via another distribution technique. In one embodiment, the data storage module 410 also stores one or more default application definitions 418 for use with unmanaged code for which it lacks specific application definitions.

In one embodiment, an application definition 418 within the storage module 410 includes an assembly manifest 420 tailored to the specific unmanaged code to which the application definition pertains. Further, one embodiment of the application definition stores a managed code "wrapper" 422 for use with the unmanaged code. The wrapper 422 is a virtual execution wrapper that projects the unmanaged code 310 as a managed assembly 316 to the CLR 214. In one embodiment, the wrapper 422 contains a managed code function written in the IL that invokes the unmanaged code. Depending upon the embodiment and/or unmanaged code, the wrapper 422 can describe specific methods for invoking the unmanaged code, such as specific entry points, command line arguments, and/or environment variables. Likewise, the wrapper 422 can use a generic method to call a default entry point of the unmanaged code.

In one embodiment, an application definition 418 also stores code modification data 424 that describe modifications to make to the unmanaged code in order to optimally execute it within the CLR 214. The described modifications can include modifications to the IAT of the PE file containing the unmanaged code that convert legacy API function calls to equivalent managed API functions calls.

A data generation module 412 generates application definitions 418 and/or additional data for existing application definitions stored in the data storage module 410. In one embodiment, the data generation module 412 provides a "wizard" or other user interface (UI) that queries an end-user of the computer system 100 for information about the unmanaged code 310. The wizard uses the end-user's answers to the queries to create an application definition 418 for the unmanaged code 310 and/or to supplement the information contained in an existing application definition.

For example, if no application definition 418 exists for some unmanaged code 310, the wizard can ask the end-user questions designed to identify from where the unmanaged code was downloaded, whether the code needs access to the network or a printer, whether the end-user trusts the vendor that provided the code, etc. The data generation module 412 uses the answers to these questions to supplement the manifest, wrapper, and/or other information contained in a default application definition and thereby creates an application definition 418 tailored to the particular unmanaged code 310. In one embodiment, the wizard or other UI provided by the data generation module 412 also allows the end-user to opt out of managed execution for the unmanaged code 310.

A data selection module 414 selects an application definition from the data storage module 410 to utilize with the unmanaged code 310 in order to produce a managed assembly 316 for execution within the CLR 214. The data selection module 414 identifies the application definition 418 that is best suited to the unmanaged code 310. In one embodiment, the data selection module 414 analyzes the unmanaged code's PE file and identifies the application program that it contains. For example, the data selection module 414 may determine that the unmanaged code 310 contains a particular word processing program based on characteristics of the PE file such as its name, size, creation date, version information, checksum, and/or other data maintained within it. Once this identification is performed, the data selection module 414 selects the corresponding application definition 418 from the data storage module 410, or a default definition, and associates it with the unmanaged code 310.

A code modification module 416 creates the managed assembly 316 from the unmanaged code 310 and the application definition 418 identified by the data selection module 414. In one embodiment, the code modification module 416 creates a new PE file containing the managed assembly 316. This new PE file contains the manifest 420 from the identified application definition and may also contain the wrapper 422 if it is used for invoking the unmanaged code 310. In one embodiment, the code modification module 416 incorporates the original unmanaged code 310 into the new PE file as a resource. In another embodiment, the unmanaged code 310 is maintained in a separate auxiliary file.

In addition, the code modification module 416 makes any code modifications described by the code modification data 424 in the application definition 418. In one embodiment, the code modification module 416 alters the IAT of the unmanaged code 310 to call the managed APIs 226 instead of the unmanaged APIs. This alteration ensures that all operations regarded as protected by the CLR 214, like file write operations in critical system folders, are executed via managed extensions. Other embodiments make other and/or different modifications.

Figure 5:
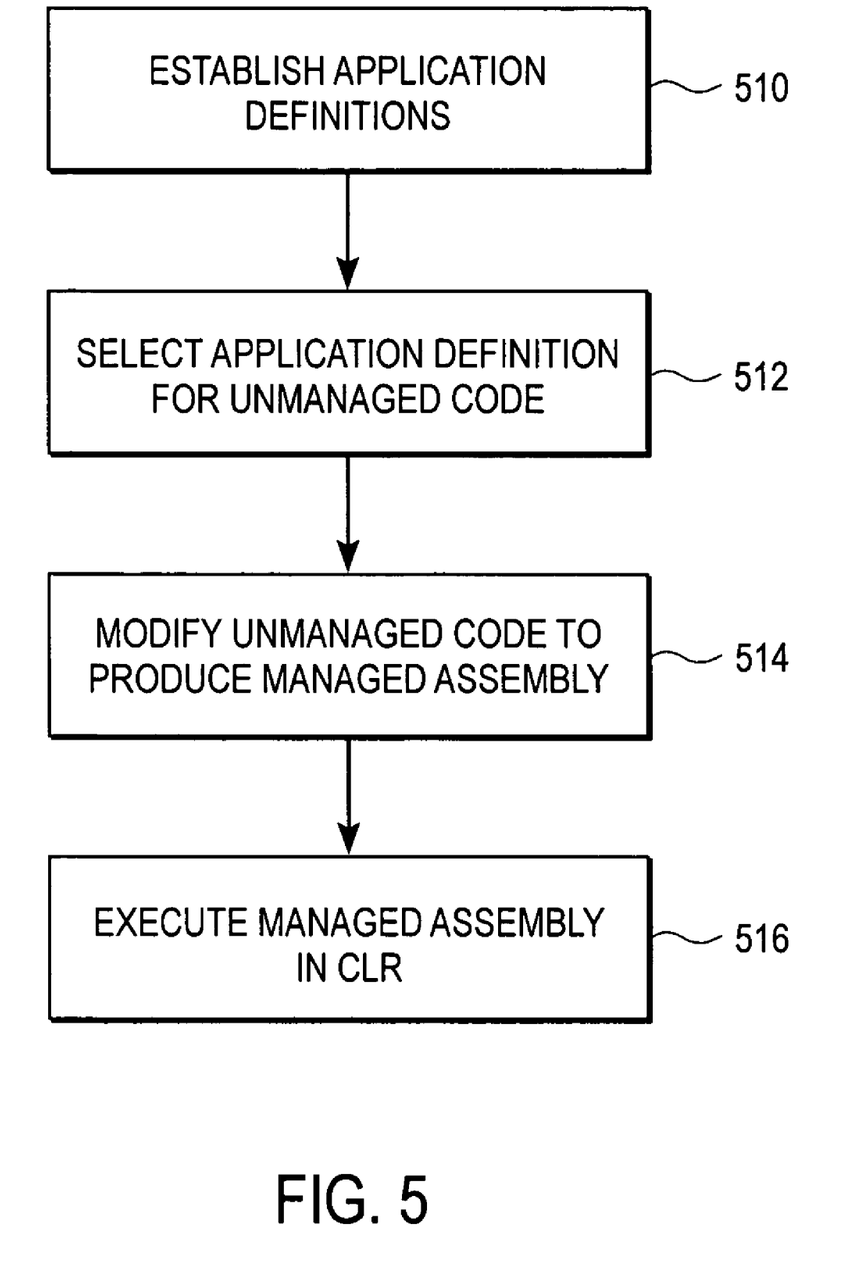
FIG. 5 is a flowchart illustrating steps performed by the transformation module and/or other entities to execute unmanaged code in the CLR execution environment according to one embodiment.

FIG. 5 is a flowchart illustrating steps performed by the transformation module 312 and/or other entities to execute unmanaged code in the CLR 214 according to one embodiment. Those of skill in the art will recognize that other embodiments can perform the steps in different orders. Likewise, other embodiments can contain other and/or additional steps than the ones shown in FIG. 5.

In one embodiment, application definitions 418 are established 510 for unmanaged code 310 on the computer system 100. The application definitions 418 can be established 510, for example, by downloading definitions specific to particular unmanaged application programs from a server on the Internet or another network, by providing an end-user with a UI that prompts for information about the code, and/or by establishing a default application definition. Generally, each application definition 418 includes a manifest 420, an execution wrapper 422, and modification data 424 describing how to modify the unmanaged code for the CLR 214. Some application definitions 418 may lack one or more of these components.

At some point, the transformation module 312 is activated in order to transform specific unmanaged code 310 into a managed assembly 316. This activation can occur, for example, when the operating system is asked to execute the unmanaged code, when the transformation module 312 scans the storage device 108 on the computer system 100 to look for unmanaged code, or when the end-user specifically directs the transformation module to act on the unmanaged code. The transformation module 312 selects 512 an application definition 418 for the unmanaged code 310. In one embodiment, the transformation module 312 examines the PE file containing the unmanaged code 310 and identifies an application definition 418 corresponding to the code. If no corresponding definition is found, a default application definition 418 is selected and/or a UI is provided to the end-user to gather information utilized to create an application definition.

The transformation module 312 modifies 514 the unmanaged code 310 to produce a corresponding managed assembly 316. In one embodiment, the transformation module 312 creates a new managed assembly 316 that includes the manifest and execution wrapper from the application definition. The transformation module 312 modifies the unmanaged code 310 by altering its IAT to call managed APIs instead of unmanaged APIs and/or makes other modifications to the code as specified by the application definition 418. The modified unmanaged code is stored as a resource of the managed assembly 316 and/or as an auxiliary file. In another embodiment, the transformation module 312 does not include a wrapper in the managed assembly 316.

The managed assembly 316 is executed 516 in the CLR 214. As part of this execution, the CLR 214 computes the effective permissions set based upon the manifest 420, the security policy 224, the role of the end-user, and/or other information and creates a domain having the computed permissions. In addition, the compiler module 212 compiles the wrapper 422 into managed code for the computer system 100. The CLR 214 loads the managed code into a domain having the computed permissions and executes the code within that domain. This execution invokes the unmanaged code 310. When the unmanaged code 310 makes an API call, the call is redirected to the equivalent managed API function due to the modifications to the code's IAT. The CLR 214 checks the effective permissions set to determine whether the domain permits the API function. If the permission demand made by the API call exceeds the effective permissions set, the CLR 214 raises a security exception. This security exception can result in termination of the unmanaged code 310, a prompt to the end-user to seek permission to continue executing the code, or another action depending upon the configuration of the CLR 214. Thus, the transformation module 314 allows unmanaged code to execute within the CLR 214 and take advantage of the security paradigm provided therein.

The above description is included to illustrate the operation of the preferred embodiments and is not meant to limit the scope of the invention. Those of skill in the art will recognize that when the description refers to "an embodiment" or "another embodiment," it may be referring to the same and/or different embodiments. The scope of the invention is to be limited only by the following claims. From the above discussion, many variations will be apparent to one skilled in the relevant art that would yet be encompassed by the spirit and scope of the invention.

We claim:

1. A method for adapting unmanaged computer program code to execute in a managed execution environment of a computer system, comprising:
   gathering information about the unmanaged code to identify an application program with which the unmanaged code is associated;
   selecting an application definition for the unmanaged code from among a plurality of application definitions responsive to the gathered information, the application definition describing how to transform the application program having unmanaged code into a managed assembly; and
   generating a managed assembly from the unmanaged code based on the selected application definition, the managed assembly adapted for execution in the managed execution environment.

2. The method of claim 1, wherein the generating comprises:
   retrieving a managed execution wrapper tailored to the unmanaged code from the application definition; and
   incorporating the managed execution wrapper with the unmanaged code to invoke the unmanaged code in the managed execution environment.

3. The method of claim 1, wherein the generating comprises:
   retrieving a manifest tailored to the unmanaged code from the application definition, the manifest describing characteristics of the unmanaged code; and
   incorporating the manifest with the unmanaged code to produce the managed assembly.

4. The method of claim 1, wherein the generating comprises:
   replacing unmanaged application programming interface (API) calls in the unmanaged code with calls to equivalent managed APIs provided by the managed execution environment.

5. The method of claim 1, wherein gathering information about the unmanaged code comprises:
   querying an end-user of the computer system about characteristics of the unmanaged code.

6. The method of claim 1, wherein the generating comprises:
   retrieving code modification data from the application definition, the code modification data describing modifications of the unmanaged code enabling the unmanaged code to execute in the managed execution environment; and
   modifying the unmanaged code based on the code modification data.

7. A system for adapting unmanaged computer program code to execute in a managed execution environment of a computer system, comprising:
   a processor; and
   a computer-readable storage medium storing processor-executable program instructions comprising:
      a data generation module for gathering information about the unmanaged code to identify an application program with which the unmanaged code is associated;
      a data selection module for selecting an application definition for the unmanaged code from among a plurality of application definitions responsive to the gathered information, the application definition describing how to transform the application program having unmanaged code into a managed assembly; and
      a code modification module for generating a managed assembly from the unmanaged code based on the selected application definition, the managed assembly adapted for execution in the managed execution environment.

8. The system of claim 7, wherein the code modification module is adapted to:
   retrieve a managed execution wrapper tailored to the unmanaged code from the application definition; and
   incorporate the managed execution wrapper with the unmanaged code to invoke the unmanaged code in the managed execution environment.

9. The system of claim 7, wherein the code modification module is adapted to:
   retrieve a manifest tailored to the unmanaged code from the application definition, the manifest describing characteristics of the unmanaged code; and
   incorporate the manifest with the unmanaged code to produce the managed assembly.

10. The system of claim 7, wherein the code modification module is adapted to:
    replace unmanaged application programming interface (API) calls in the unmanaged code with calls to equivalent managed APIs provided by the managed execution environment.

11. The system of claim 7, wherein the data generation module is adapted to:
    query an end-user of the computer system about characteristics of the unmanaged code.

12. The system of claim 7, wherein the code modification module is adapted to:

retrieve code modification data from the application definition, the code modification data describing modifications of the unmanaged code enabling the unmanaged code to execute in the managed execution environment; and modify the unmanaged code based on the code modification data.

13. A computer program product having a computer-readable storage medium having executable computer program instructions recorded thereon for adapting unmanaged computer program code to execute in a managed execution environment of a computer system, comprising:

a data generation module for gathering information about the unmanaged code to identify an application program with which the unmanaged code is associated;

a data selection module for selecting an application definition for the unmanaged code from among a plurality of application definitions responsive to the gathered information, the application definition describing how to transform the application program having unmanaged code into a managed assembly; and a code modification module for generating a managed assembly from the unmanaged code based on the selected application definition, the managed assembly adapted for execution in the managed execution environment.

14. The computer program product of claim 13, wherein the code modification module is adapted to:

retrieve a managed execution wrapper tailored to the unmanaged code from the application definition; and incorporate the managed execution wrapper with the unmanaged code to invoke the unmanaged code in to the managed execution environment.

15. The computer program product of claim 13, wherein the code modification module is adapted to:

retrieve a manifest tailored to the unmanaged code from the application definition, the manifest describing characteristics of the unmanaged code; and incorporate the manifest with the unmanaged code to produce the managed assembly.

16. The computer program product of claim 13, wherein the code modification module is adapted to:

replace unmanaged application programming interface (API) calls in the unmanaged code with calls to equivalent managed APIs provided by the managed execution environment.

17. The computer program product of claim 13, wherein the data generation module is adapted to:

query an end-user of the computer system about characteristics of the unmanaged code.

18. The computer program product of claim 13, wherein the code modification module is adapted to:

retrieve code modification data from the application definition, the code modification data describing modifications of the unmanaged code enabling the unmanaged code enabling the unmanaged code to execute in the managed execution environment; and modify the unmanaged code based on the code modification data.

19. A system for adapting unmanaged computer program code to execute in a managed execution environment of a computer system, comprising:

data gathering means for gathering information about the unmanaged code to identify an application program with which the unmanaged code is associated;

data selection means for selecting an application definition for the unmanaged code from among a plurality of application definitions responsive to the gathered information, the application definition describing how to transform the application program having unmanaged code into a managed assembly; and code modification means for generating a managed assembly from the unmanaged code based on the selected application definition, the managed assembly adapted for execution in the managed execution environment.

* * * * *

UNITED STATES PATENT AND TRADEMARK OFFICE
CERTIFICATE OF CORRECTION

PATENT NO. : 7,752,242 B1 Page 1 of 1
APPLICATION NO. : 11/231681
DATED : July 6, 2010
INVENTOR(S) : Sourabh Satish et al.

It is certified that error appears in the above-identified patent and that said Letters Patent is hereby corrected as shown below:

Column 10, line 18, after "code", delete "enabling the unmanaged code".

Signed and Sealed this

Twenty-sixth Day of October, 2010

David J. Kappos
*Director of the United States Patent and Trademark Office*